United States Patent
Nagano

(10) Patent No.: US 11,760,409 B2
(45) Date of Patent: Sep. 19, 2023

(54) STEERING DEVICE

(71) Applicant: JTEKT CORPORATION, Osaka (JP)

(72) Inventor: Takanobu Nagano, Kishiwada (JP)

(73) Assignee: JTEKT CORPORATION, Kariya (JP)

( * ) Notice: Subject to any disclaimer, the term of this patent is extended or adjusted under 35 U.S.C. 154(b) by 346 days.

(21) Appl. No.: 17/323,283

(22) Filed: May 18, 2021

(65) Prior Publication Data

US 2021/0362776 A1    Nov. 25, 2021

(30) Foreign Application Priority Data

May 22, 2020    (JP) .................. 2020-089792

(51) Int. Cl.
| | | |
|---|---|---|
| *B62D 5/04* | (2006.01) | |
| *B62D 5/06* | (2006.01) | |
| *B62D 6/00* | (2006.01) | |

(52) U.S. Cl.
CPC ............ *B62D 5/0463* (2013.01); *B62D 5/06* (2013.01); *B62D 6/002* (2013.01)

(58) Field of Classification Search
CPC ......... B62D 5/0463; B62D 5/06; B62D 6/002
See application file for complete search history.

(56) References Cited

U.S. PATENT DOCUMENTS

| | | | | |
|---|---|---|---|---|
| 4,895,216 A | * | 1/1990 | Fusimi ................ | B62D 5/0463 |
| | | | | 180/404 |
| 5,954,152 A | * | 9/1999 | Kada ..................... | B62D 5/065 |
| | | | | 701/42 |
| 10,358,163 B2 | * | 7/2019 | Tsubaki ............. | B62D 15/0285 |
| 2002/0005314 A1 | * | 1/2002 | Takehara ............. | B62D 5/0466 |
| | | | | 180/443 |
| 2007/0043490 A1 | * | 2/2007 | Yokota ................ | B62D 5/0463 |
| | | | | 701/41 |
| 2007/0289806 A1 | * | 12/2007 | Matsuda ............. | B62D 5/0472 |
| | | | | 180/444 |

(Continued)

FOREIGN PATENT DOCUMENTS

| | | |
|---|---|---|
| FR | 2 908 377 A1 | 5/2008 |
| JP | 2017-056745 A | 3/2017 |

(Continued)

OTHER PUBLICATIONS

Nov. 19, 2021 Extended European Search Report issued in European Patent Application No. 21174624.3.

*Primary Examiner* — Minnah L Seoh
*Assistant Examiner* — Ryan Edward Hardy
(74) *Attorney, Agent, or Firm* — Oliff PLC

(57) ABSTRACT

A steering device is connected to a turning mechanism to which a part of a turning force is applied by a hydraulic mechanism. The steering device includes an electric motor, a rotation angle detector, and a steering control device. The steering control device is configured to acquire a target turning angle which is a target value of a turning angle of turning wheels, to control the electric motor such that a turning angle of the turning wheels reaches the target turning angle, to estimate a delay of an actual turning angle of the turning wheels with respect to the target turning angle based on a delay model with the detected rotation angle as an input, to output delay information, and to correct the target turning angle based on the delay information.

4 Claims, 5 Drawing Sheets

(56) References Cited

U.S. PATENT DOCUMENTS

| | | | | |
|---|---|---|---|---|
| 2015/0239491 A1* | 8/2015 | Bolourchi | ............ | B62D 5/0463 |
| | | | | 701/41 |
| 2019/0168802 A1* | 6/2019 | Matsumura | ............ | B62D 5/065 |
| 2021/0156403 A1* | 5/2021 | Rushton | ................ | E02F 9/2221 |

FOREIGN PATENT DOCUMENTS

| | | | | |
|---|---|---|---|---|
| WO | WO-2015132508 A1 * | 9/2015 | ............ | B62D 5/0463 |
| WO | WO-2017060958 A1 * | 4/2017 | ................ | B62D 1/00 |
| WO | WO-2018055803 A1 * | 3/2018 | ............ | B62D 5/0463 |
| WO | WO-2019044638 A1 * | 3/2019 | ................ | B60T 7/12 |

* cited by examiner

STEERING DEVICE

CROSS-REFERENCE TO RELATED APPLICATION

This application claims priority to Japanese Patent Application No. 2020-089792 filed on May 22, 2020, incorporated herein by reference in its entirety.

BACKGROUND

1. Technical Field

The disclosure relates to a steering device that is connected to a turning mechanism to which a part of a turning force is applied by a hydraulic mechanism.

2. Description of Related Art

A hydraulic power steering device that applies an assist force to a turning mechanism of a vehicle by supplying a hydraulic oil from an oil pump to a power cylinder coupled to the turning mechanism via a hydraulic pressure control valve is known in the related art.

For example, a hydraulic power steering device described in Japanese Unexamined Patent Application Publication No. 2017-56745 (JP 2017-56745 A) is a device that applies an assist force from an electric motor in addition to a hydraulic pressure to a turning mechanism. In the hydraulic power steering device, by detecting a steering torque based on a rotation speed signal of the electric motor, the number of torsion bars which are provided in the steering device can be decreased and a phase difference between a driver's steering angle and a turning angle of turning wheels can be curbed.

SUMMARY

The inventor found that a delay of turning of turning wheels with respect to a driver's operation is not based on only the torsion bars which are externally fitted to a steering shaft. As a result of earnest experiment and study, the inventor found that a turning angle is delayed with respect to a driver's steering more than supposed due to slowness of a reaction (looseness) of the hydraulic mechanism particularly when steering of repeating turning and returning of a steering wheel is performed at the time of traveling on an S-curved road.

The disclosure provides a steering device that can curb a delay of an actual turning angle with respect to a target turning angle.

According to an aspect of the disclosure, there is provided a steering device that is connected to a turning mechanism to which a part of a turning force is applied by a hydraulic mechanism. The steering device includes: an electric motor that outputs a driving force which is applied to the turning mechanism; a rotation angle detector that detects a rotation angle based on rotation of the electric motor and outputs the detected rotation angle; and a steering control device. The steering control device is configured to acquire a target turning angle which is a target value of a turning angle of turning wheels, to control the electric motor such that a turning angle of the turning wheels reaches the target turning angle, to estimate a delay of an actual turning angle of the turning wheels with respect to the target turning angle based on a delay model with the detected rotation angle as an input, to output delay information, and to correct the target turning angle based on the delay information.

According to the aspect, it is possible to curb a delay of an actual turning angle of turning wheels with respect to a target turning angle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a steering device according to an embodiment of the disclosure will be described with reference to the accompanying drawings. Numerical values, shapes, materials, constituents, positional relationships and connection states between the constituents, steps, and the order of steps described in the following embodiment are merely examples and are not intended to limit the disclosure. A plurality of disclosures may be described as one embodiment in the following description, and elements not described in the appended claims are considered to be arbitrary elements of the disclosures according to the claims. The drawings are schematic diagrams with appropriate emphasis, omission, and ratio adjustment to describe the disclosure and may not reflect actual shapes, positional relationships, and ratios.

Figure 1:
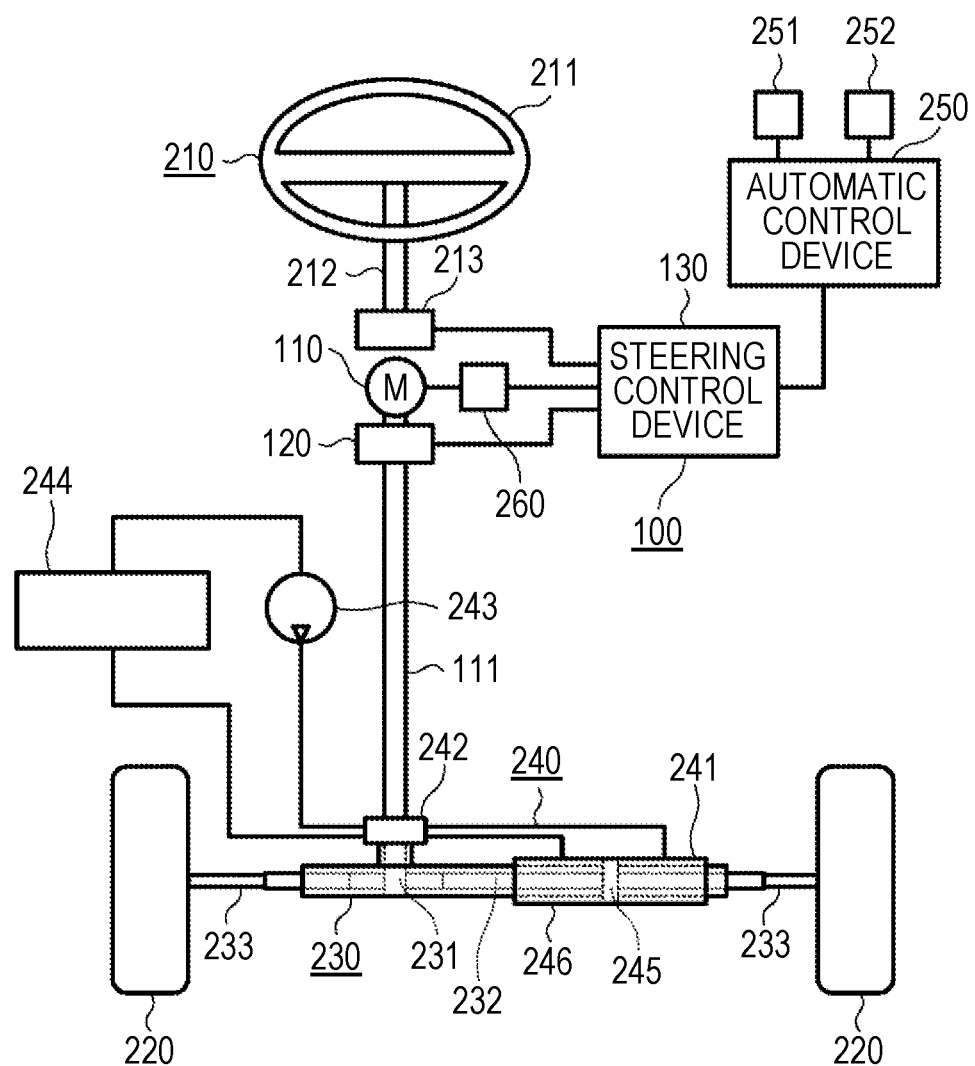
FIG. 1 is a diagram schematically illustrating a steering system including a steering device.

FIG. 1 is a diagram schematically illustrating a steering system including a steering device. The steering system 200 is a system that turns turning wheels 220 in accordance with a target turning angle and changes a traveling direction of a vehicle in which the steering system 200 is mounted. The steering system 200 includes a turning mechanism 230, a hydraulic mechanism 240, and a steering device 100.

The turning mechanism 230 is a mechanism that turns the turning wheels 220. The turning mechanism 230 is not particularly limited, and a rack-and-pinion is employed in this embodiment. Specifically, the turning mechanism 230 includes a pinion shaft 231, a rack shaft 232, and tie rods 233.

The pinion shaft 231 is a rod-shaped member including a pinion that engages with a rack provided in the rack shaft 232. The pinion shaft 231 is connected to the steering device 100 and rotates with a torque applied from the steering device 100 such that the rack shaft 232 moves in an axial direction of the rack shaft 232.

The rack shaft 232 is a member that includes a rack which engages with the pinion shaft 231 and is provided on a part of an outer circumferential surface thereof, converts rotation of the pinion shaft 231 to translation in the axial direction of the rack shaft 232, and turns the turning wheels 220 via the tie rods 233. The hydraulic mechanism 240 is connected to the rack shaft 232, and a part of a turning force for turning the turning wheels 220, that is, an assist force, is hydraulically applied thereto. The rack shaft 232 is accommodated in a rack housing that is attached to a vehicle body and movement of the rack shaft 232 is guided by the rack housing.

The hydraulic mechanism 240 adjusts a hydraulic pressure based on a rotation angle of the pinion shaft 231 or the like and applies a force in the axial direction of the rack shaft 232 as a part of the turning force to the rack shaft 232. The hydraulic mechanism 240 is not particularly limited and includes a power cylinder 241, a rotary valve 242, an oil pump 243, and a reservoir tank 244 in this embodiment.

The power cylinder 241 includes a cylinder 246 which is partitioned into two spaces by a piston 245, and the piston 245 moves in the axial direction of the rack shaft 232 by adjusting hydraulic pressures of oils with which the two spaces are charged. The piston 245 is connected to the rack shaft 232, and the piston 245 applies a force in a moving direction to the rack shaft 232.

The rotary valve 242 is a device that adjusts the hydraulic pressures supplied to the two spaces partitioned by the piston 245. The structure of the rotary valve 242 is not particularly limited and includes a torsion bar (not illustrated) which is interposed between the pinion shaft 231 and the steering device 100 in this embodiment. The rotary valve 242 controls the operation of the piston 245 by adjusting an amount of oil supplied from the oil pump 243 with relative movement of an inner valve and an outer valve due to torsion of the torsion bar and supplied to one of the two spaces partitioned by the piston 245 and adjusting an amount of oil recirculating to the reservoir tank 244 out of excess oil in the other space.

The steering device 100 is a device that mechanically applies an instruction for the turning angle to the turning mechanism 230 and causes the turning mechanism 230 to turn the turning wheels 220, and includes an electric motor 110, a rotation angle detector 120, and a steering control device 130.

The electric motor 110 outputs a driving force which is applied to the turning mechanism 230. A transmission mode of transmitting the driving force generated by the electric motor 110 to the turning mechanism 230 is not particularly limited and the electric motor 110 is connected to a steering shaft member 111 connected to the pinion shaft 231 of the turning mechanism 230 without interposing a reduction gear therebetween and transmits rotation of the output shaft of the electric motor 110 to the pinion shaft 231 at a rotation ratio of 1:1 in this embodiment. A motor turning force which is a turning force applied from the electric motor 110 to the turning mechanism 230 is much less than a hydraulic turning force which is a turning force applied from the hydraulic mechanism 240 to the turning mechanism 230. For example, most of the force for turning the turning wheels 220 is the hydraulic turning force, and the motor turning force is transmitted to the turning mechanism 230 as a control force (control information) for controlling the turning angle and the turning direction of the turning wheels 220.

The rotation angle detector 120 is a device that detects a rotation angle for controlling the hydraulic mechanism 240 based on the rotation of the electric motor 110 and outputs the detected rotation angle. In this embodiment, since the ratio of the rotation angle of the rotary valve 242 that controls the hydraulic mechanism 240 to the rotation angle of the electric motor 110 is 1:1, the rotation angle detector 120 is a device that detects the rotation angle of the output shaft of the electric motor 110 and outputs the detected rotation angle. The type of the rotation angle detector 120 is not particularly limited, and it has a configuration that includes a primary gear rotating along with the output shaft of the electric motor 110 and two secondary gears with different diameters engaging with the primary gear and that can detect a rotation direction as well as the rotation angle of the output shaft by detecting rotation of permanent magnets provided in the secondary gears using a Hall element or the like in this embodiment.

Figure 2:
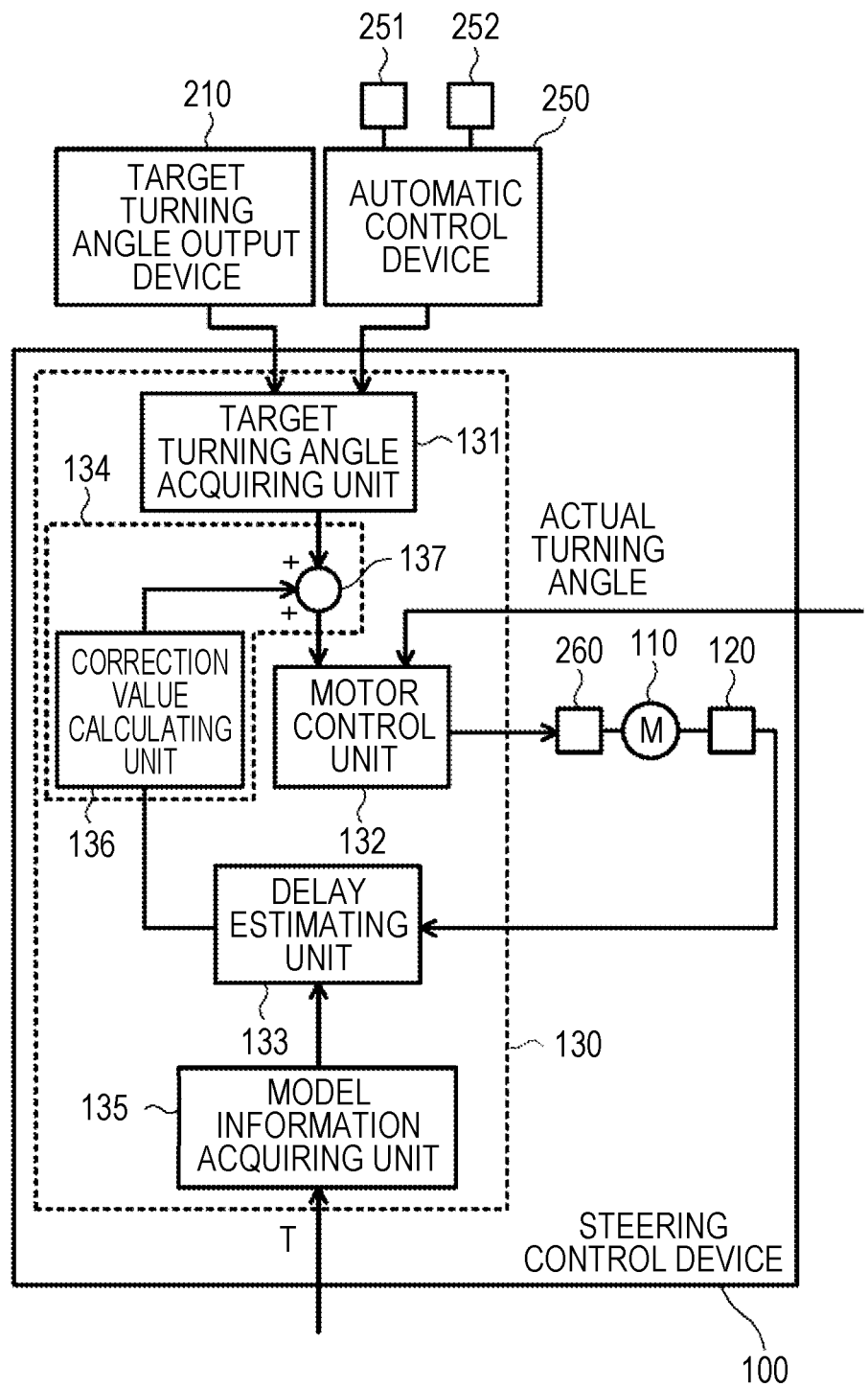
FIG. 2 is a block diagram illustrating a functional configuration of the steering device.

FIG. 2 is a block diagram illustrating the functional configuration of the steering device. The steering control device 130 is a device that controls the electric motor 110 such that the electric motor 110 operates by a rotation angle of the output shaft corresponding to a target turning angle and is an electronic control unit (ECU). The steering device 100 includes a target turning angle acquiring unit 131, a motor control unit 132, a delay estimating unit 133, and a correction unit 134 as processing units which are realized by executing a program. In this embodiment, the steering device 100 further includes a model information acquiring unit 135 as a processing unit.

The target turning angle acquiring unit 131 acquires a target turning angle for turning the turning wheels 220. In this embodiment, the target turning angle acquiring unit 131 acquires the target turning angle from a target turning angle output device 210 or an automatic control device 250.

The target turning angle output device 210 is a device that outputs a target turning angle desired by a driver when the driver operates an operation member 211 such as a steering wheel. In this embodiment, as illustrated in FIG. 1, the target turning angle output device 210 includes an operation member 211, a shaft member 212, and a target turning angle detector 213. The target turning angle output device 210 may further include a torque detecting device and a reaction force device.

The shaft member 212 is a rod-shaped member that is mechanically connected to the operation member 211 and rotates in response to the operation of the operation member 211. In this embodiment, the shaft member 212 is connected to a reaction force device and a reaction force for giving a steering feeling based on a driving condition or the like to the driver operating the operation member 211 is applied to the shaft member 212.

The connection mode between the shaft member 212 and the turning mechanism 230 is not particularly limited and, for example, the shaft member 212 may be mechanically connected to the pinion shaft 231 via the steering shaft member 111, or mechanical connection between the shaft member 212 and the pinion shaft 231 may be cut off using a clutch or the like during automated driving. In this embodiment, the shaft member 212 and the turning mechanism 230 are not mechanically connected, and the steering system 200 is a so-called linkless steer-by-wire system.

The target turning angle detector 213 is a device that detects a rotation angle of the operation member 211 and outputs the detected rotation angle as a target turning angle. In this embodiment, the target turning angle detector 213 detects the rotation of the shaft member 212 as the rotation of the operation member 211. The type of the target turning angle detector 213 is not particularly limited and, for example, a resolver, a rotary encoder, or the same device as the rotation angle detector 120 which is attached to the electric motor 110 can be used.

The automatic control device 250 is an ECU that automatically drives the vehicle in which the steering system 200 is mounted. In this embodiment, the automatic control device 250 acquires information on an obstacle, a white line, a signal, and the like outside the vehicle, for example, from a camera 251 or a sensor such as a laser LiDAR 252, sequentially generates a target turning angle corresponding to automated driving based on the acquired information, and outputs the generated target turning angle to the target turning angle acquiring unit 131.

The motor control unit 132 controls the electric motor 110 such that the turning angle of the turning wheels 220 reaches the target turning angle based on the target turning angle acquired by the target turning angle acquiring unit 131. In this embodiment, the electric motor 110 is supplied with electric power from a PWM inverter 260 including a plurality of switching elements. The motor control unit 132 performs angle feedback control for controlling the motor torque of the electric motor 110 based on a difference between the target turning angle and the actual turning angle of the turning wheels 220. In general, PID control is used as the angle feedback control. Specifically, a target torque is calculated by multiplying a term of the difference between the target turning angle and the actual turning angle, an integral term of the difference, and a differential term of the difference by a proportional gain, an integral gain, and a differential gain, respectively, and summing the terms, and the target torque is output as a current command value to the PWM inverter 260.

The delay estimating unit 133 is a processing unit that estimates a delay of the actual turning angle of the turning wheels 220 with respect to the target turning angle acquired from the target turning angle acquiring unit 131 based on a delay model with the detected rotation angle as an input and outputs delay information. The delay model is a model that can derive a delay state of the hydraulic mechanism 240 by a linear or nonlinear arithmetic operation. For example, a transfer function of a delay system can be exemplified as one delay model. Specifically, Expression 1 described below represents a model of a first-order delay system.

$$G(s)=1/(1+Ts)$$ Expression 1

The correction unit 134 includes a correction value calculating unit 136 and an adder unit 137. The correction value calculating unit 136 calculates an angle compensation value which is a correction value of the target turning angle based on the delay information. The adder unit 137 corrects the target turning angle by adding (which includes addition of a negative angle, that is, subtraction) the angle compensation value which is the delay information indicating an angle to the target turning angle acquired by the target turning angle acquiring unit 131.

The model information acquiring unit 135 acquires model information on the delay model acquired based on the target turning angle and the actual turning angle of the turning wheels 220. For example, when the delay model is a model expressed by Expression 1, the model information is T and the model information acquiring unit 135 acquires and stores the input T and outputs T to the delay estimating unit 133.

Figure 3:
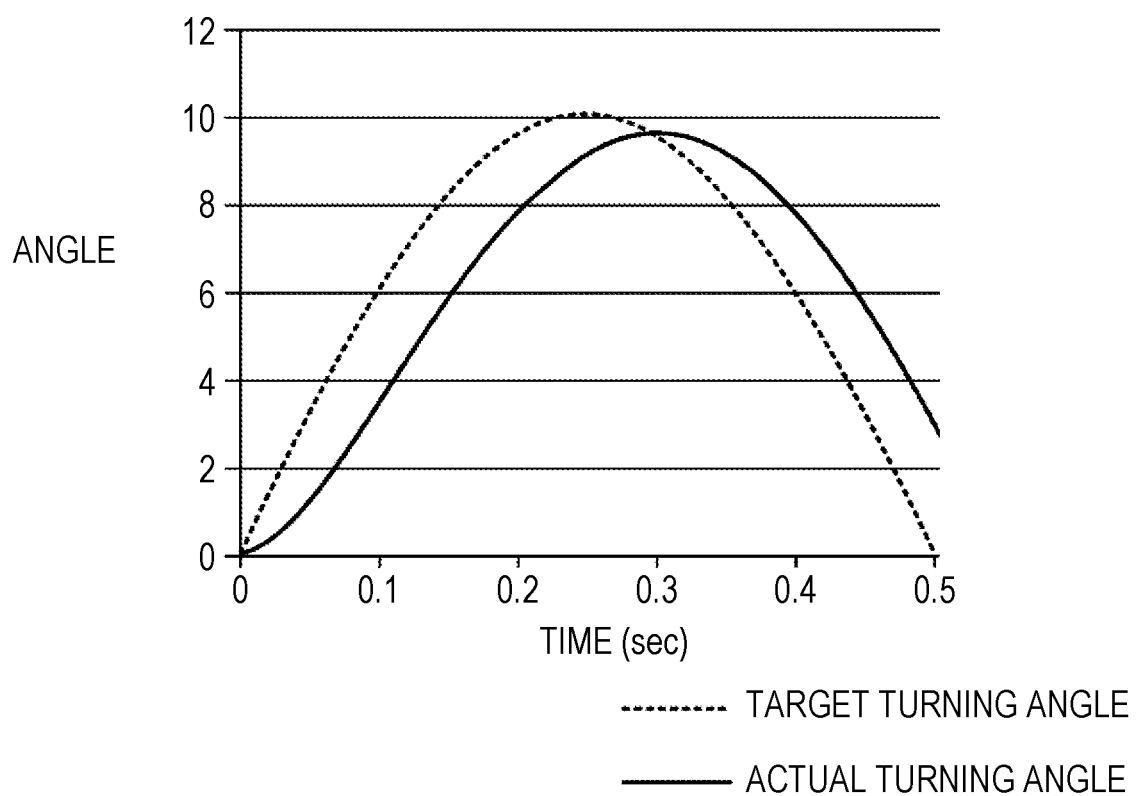
FIG. 3 is a graph illustrating a state in which an actual turning angle is delayed with respect to a target turning angle.

By actually causing the vehicle to travel, a delay state of the actual turning angle of the turning wheels 220 with respect to the target turning angle as illustrated in FIG. 3 can be acquired and T derived based on the acquired data can be input to the model information acquiring unit 135. Accordingly, even when steering systems 200 are of different types, steering devices 100 which are mounted in the different types of steering systems 200 can be commonized by deriving T and inputting the derived T to the steering devices 100.

With the steering device 100 provided in the aforementioned steering system 200, for example, even in a situation in which turning and returning of a steering wheel are alternately performed as on an S-curved road, a delay based on looseness of the hydraulic mechanism can be estimated in advance and the electric motor 110 can be controlled such that the delay does not occur.

In automated driving, since delay of the actual turning angle of the turning wheels 220 with respect to the target turning angle output from the automatic control device 250 is curbed, it is possible to enhance safety in travel of a vehicle.

By causing the hydraulic mechanism 240 to generate most of the turning force required for turning the turning wheels 220, it is possible to achieve a decrease in size of the electric motor 110 and to achieve a decrease in size of the steering device 100 as a whole. Accordingly, it is possible to improve a degree of freedom in an arrangement position of the steering device 100.

The disclosure is not limited to the aforementioned embodiment. For example, an embodiment realized by combining elements described in this specification and excluding some elements is included as an embodiment of the disclosure. Modified examples obtained by performing various modifications considered by those skilled in the art without departing from the gist of the disclosure, that is, the meaning of words described in the appended claims, are included in the disclosure.

Figure 4:
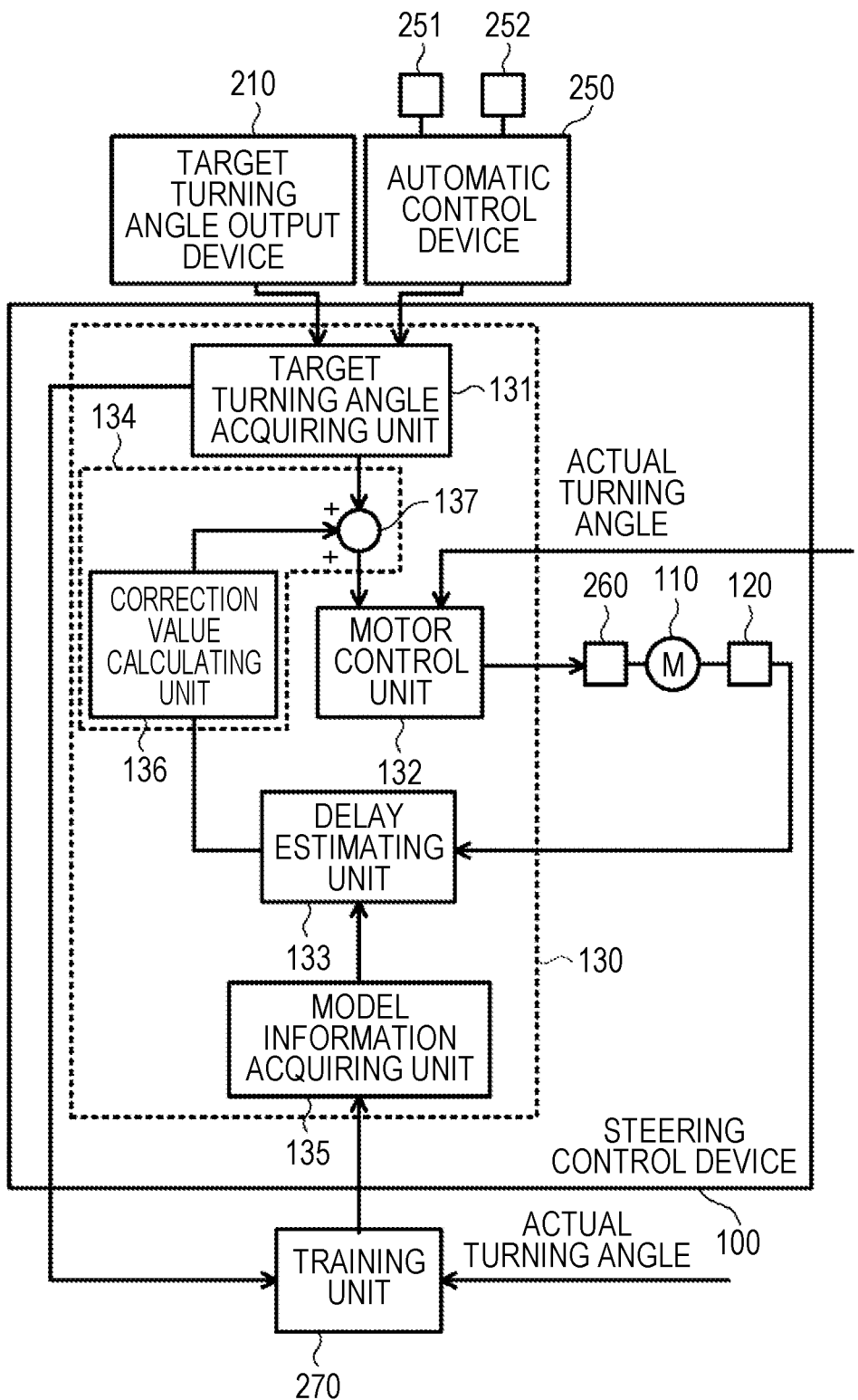
FIG. 4 is a block diagram illustrating another example of the functional configuration of the steering device.

For example, the delay estimating unit 133 may be an artificial intelligence (AI) which has been trained by supervised learning, unsupervised learning, reinforcement learning, or the like. In this case, as illustrated in FIG. 4, information on the artificial intelligence trained by a training unit 270 using inputs including the target turning angle acquired from the target turning angle acquiring unit 131 and the actual turning angle may be acquired as model information by the model information acquiring unit 135.

Figure 5:
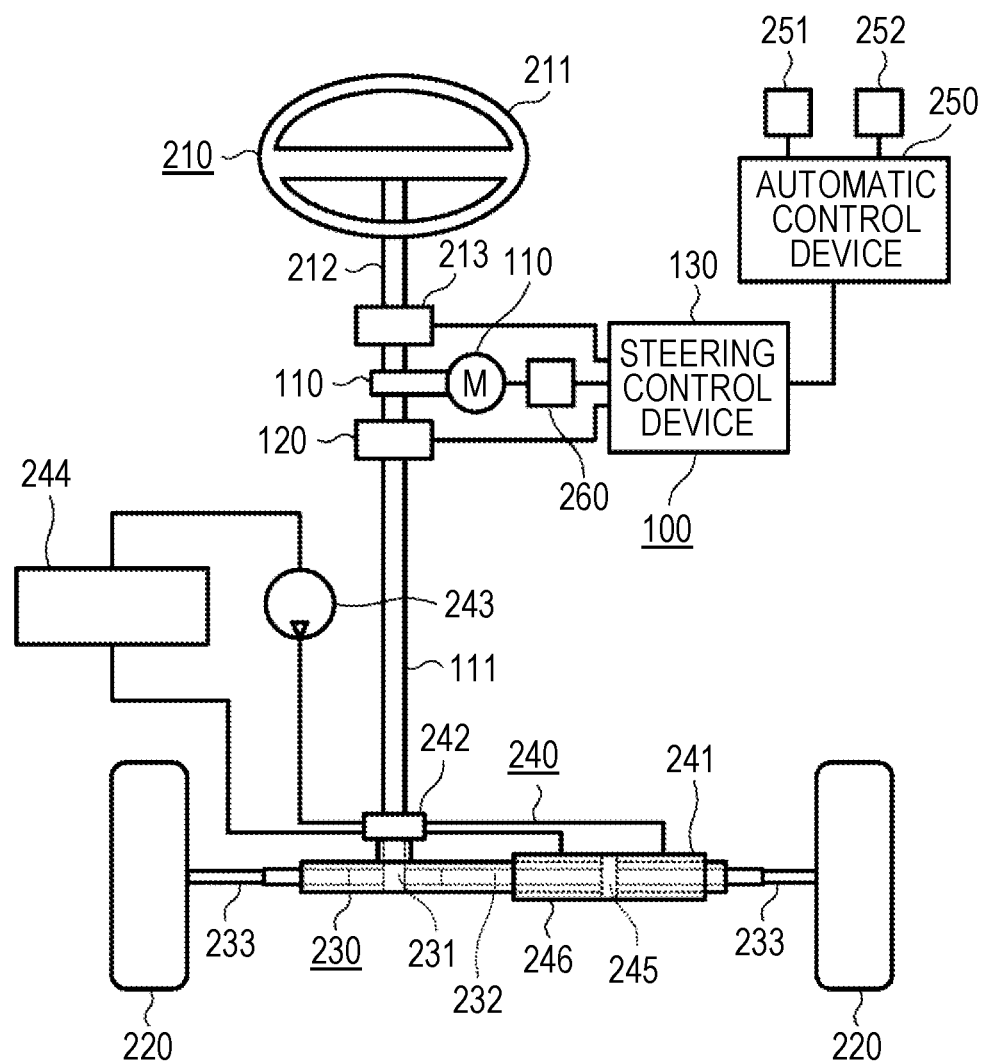
FIG. 5 is a diagram schematically illustrating another example of a steering system including the steering device.

As illustrated in FIG. 5, the steering system 200 may be a system in which the steering shaft member 111 and the shaft member 212 are mechanically connected such that a torque when a driver operates the operation member 211 is mechanically transmitted as a part of the turning force to the turning mechanism 230.

As illustrated in FIG. 5, the electric motor 110 may transmit a torque to the steering shaft member 111 via a reduction gear.

An example in which the rotation angle detector 120 is disposed between the electric motor 110 and the pinion shaft 231 has been described above. However, as long as it can detect the turning angle of the turning wheels 220, the rotation angle detector 120 may be disposed at any position between the electric motor 110 and the turning wheels 220. In this case, the delay estimating unit 133 estimates a "response delay between the rotation angle detector 120 and the turning wheels 220"+a "response delay of turning angle control PID," which matches a "response delay between the target turning angle and the turning angle."

The disclosure is applicable to a vehicle, particularly, to a large vehicle, an agricultural vehicle, a construction vehicle, and the like of which turning of turning wheels requires a large force.

What is claimed is:
1. A steering device that is connected to a turning mechanism to which a part of a turning force is applied by a hydraulic mechanism, the steering device comprising:
   an electric motor that outputs a driving force which is applied to the turning mechanism;
   a rotation angle detector that detects a rotation angle based on rotation of the electric motor and outputs the detected rotation angle; and a steering control device configured to
acquire a target turning angle which is a target value of a turning angle of turning wheels,
control the electric motor such that a turning angle of the turning wheels reaches the target turning angle,
estimate a delay of an actual turning angle of the turning wheels with respect to the target turning angle based on a delay model with the detected rotation angle as an input and output delay information, and
correct the target turning angle based on the delay information.

2. The steering device according to claim 1, wherein the delay model which is provided in the steering control device is a transfer function of a delay system.

3. The steering device according to claim 1, wherein the delay model which is provided in the steering control device is a nonlinear model.

4. The steering device according to claim 1, wherein the steering control device is configured to acquire model information on the delay model which is acquired based on the target turning angle and the actual turning angle of the turning wheels.

\* \* \* \* \*